United States Patent
Lu et al.

(10) Patent No.: US 11,114,893 B2
(45) Date of Patent: Sep. 7, 2021

(54) SMART OUTLET SYSTEM WITH FAST FREQUENCY TRACKING FOR POWER SYSTEM FREQUENCY CONTROL USING DISTRIBUTED APPLIANCES

(71) Applicants: Xiao Lu, Nanjing (CN); Di Shi, San Jose, CA (US); Yingmeng Xiang, San Jose, CA (US); Haifeng Li, Nanjing (CN); Chunlei Xu, Nanjing (CN); Zhe Yu, San Jose, CA (US); Jiangpeng Dai, San Jose, CA (US); Shiming Xu, Nanjing (CN); Xueming Li, Nanjing (CN); Haiyun Han, San Jose, CA (US); Zhiwei Wang, San Jose, CA (US)

(72) Inventors: Xiao Lu, Nanjing (CN); Di Shi, San Jose, CA (US); Yingmeng Xiang, San Jose, CA (US); Haifeng Li, Nanjing (CN); Chunlei Xu, Nanjing (CN); Zhe Yu, San Jose, CA (US); Jiangpeng Dai, San Jose, CA (US); Shiming Xu, Nanjing (CN); Xueming Li, Nanjing (CN); Haiyun Han, San Jose, CA (US); Zhiwei Wang, San Jose, CA (US)

(*) Notice: Subject to any disclaimer, the term of this patent is extended or adjusted under 35 U.S.C. 154(b) by 0 days.

(21) Appl. No.: 16/396,546

(22) Filed: Apr. 26, 2019

(65) Prior Publication Data
US 2019/0379237 A1   Dec. 12, 2019

Related U.S. Application Data

(60) Provisional application No. 62/681,971, filed on Jun. 7, 2018.

(51) Int. Cl.
G05B 23/02 (2006.01)
H02J 13/00 (2006.01)
H02J 3/14 (2006.01)

(52) U.S. Cl.
CPC ...... *H02J 13/0005* (2020.01); *G05B 23/0254* (2013.01); *H02J 3/14* (2013.01); *H02J 13/00002* (2020.01); *H02J 2203/20* (2020.01); *H02J 2310/58* (2020.01)

(58) Field of Classification Search
CPC ...... H02J 13/0005; H02J 3/14; H02J 2310/58; H02J 2203/20; H02J 13/00002
USPC ........................................ 700/286
See application file for complete search history.

(56) References Cited

U.S. PATENT DOCUMENTS

| | | | | |
|---|---|---|---|---|
| 2012/0150468 | A1* | 6/2012 | Sahinoglu | G01R 19/2513 702/72 |
| 2013/0322584 | A1* | 12/2013 | Kumar | H04L 27/2688 375/349 |
| 2015/0276831 | A1* | 10/2015 | Mandic | G01R 19/2513 702/75 |
| 2016/0118803 | A1* | 4/2016 | Takahashi | H02J 3/16 700/286 |

(Continued)

*Primary Examiner* — Kenneth M Lo
*Assistant Examiner* — Michael W Choi
(74) *Attorney, Agent, or Firm* — Power Patent; Bao Tran

(57) ABSTRACT

Systems and methods are disclosed to control the power grid frequency by capturing the frequency change using an extended Kalman filter method with the distributed smart outlet devices at the low-voltage distribution level; and locally control the relay that provides power to the appliance by comparing the captured frequency with the threshold sent from the cloud control center.

15 Claims, 7 Drawing Sheets

(56) References Cited

U.S. PATENT DOCUMENTS

2018/0226797 A1\* 8/2018 Galin .................. G05F 1/66
2018/0329383 A1\* 11/2018 Lian .............. G05B 19/0426

\* cited by examiner

SMART OUTLET SYSTEM WITH FAST FREQUENCY TRACKING FOR POWER SYSTEM FREQUENCY CONTROL USING DISTRIBUTED APPLIANCES

TECHNICAL FIELD

The present invention relates to power system frequency control.

BACKGROUND

With the increasing of electricity demands and the growing of renewable energy penetration, most uncertainties were brought to the power system operation, which might put the power system on the risk of frequency instability. The frequency disturbance can be caused by contingencies, like the sudden load increasing, renewable generation fluctuation, loss of generators, and tripping of transmission lines. If not well-handled, the frequency disturbance may cause a great blackout, and bring a huge loss to the customers and society.

Considering this, many solutions were developed to sustain the power grid frequency and meet the reliability requirement of the ever-changing load demands, such as setting up new generations, transmission expansion, wide area monitoring and control based on phasor measurement units (PMUs), and deployment of energy storage, etc. These methods primarily focus on the transmission level, high/middle-voltage distribution level, and the technical schemes are lacking on the low voltage distribution level. Thus, the minimum unit of current power system load control is a feeder, and the feeder-based control technology ignores the differences in customers' needs and reduces customers' satisfaction. For example, when a power outage happens, usually the power supply of a whole community or town is shed. The appliances/devices, including the non-interruptible ones like computers and lights, or the interruptable ones like HVAC and air-conditioners, are all curtailed due to the power loss.

SUMMARY OF THE INVENTION

Systems and methods are disclosed to control the power grid frequency by capturing the frequency change using an extended Kalman filter method with the distributed smart outlet devices at the low-voltage distribution level; and locally control the relay that provides power to the appliance by comparing the captured frequency with the threshold sent from the cloud control center.

In another aspect, a system to control power frequency includes smart outlets, the EKF frequency measurement, the cloud platform, and the terminals. The smart outlet can measure the current, voltage, power and frequency, send the measurements to the cloud platform and receive commands from the cloud platform, switch on/off the appliance based on the local measurements or commands from the cloud platform.

This invention presents a novel design of a smart outlet system with fast frequency tracking for power system frequency control using distributed appliances. The system consists of computer-controlled outlets (smart outlets), an EKF based frequency measurement unit, a cloud platform, and user-interface terminals. The smart outlets have three major functions, i.e., measurement, communication, and control. The EKF frequency measurement module provides fast frequency tracking, which is adaptive to both normal operation and dynamic scenarios of power systems. Based on the frequency tracking algorithm, smart outlets can control the on/off status of plugged-in appliances in response to the frequency change and enable the distributed appliances to provide frequency control service. The cloud platform can manage and control the smart outlets, while the users can easily access the cloud platform via PC/mobile terminals.

Advantages of the system may include one or more of the following. The smart outlet system with fast frequency tracking provides efficient power system frequency control using distributed appliances. The smart outlet can accurately and robustly track the power system frequency change and enable the switching of the connected appliances in response to power system frequency fluctuation based on the local measurements and the setting commands from the cloud platform. Since the importance and load characteristics of the devices/appliances are different, non-critical and interruptible loads are aggregated and controlled by the instant system. Thus, when the load curtailment becomes inevitable in case of some very severe contingencies, those aggregated interruptible load demands will be chosen and shed, while the critical loads are not affected. The system enables the power system frequency control using distributed interruptable appliances. The frequency measured by the EKF method is lightweight, accurate and robust. The cloud platform can analyze the aggregated flexible load demand based on the measurements sent from the smart outlets and make the frequency control decisions. The users can get access to the cloud platform via PC or mobile terminals. Frequency measurement experiments are conducted using both simulated data and real event data in both the simulation environment and the real hardware environment. It is verified that the proposed smart outlet system design can track the frequency dynamic change accurately, thus enabling the frequency response of the distributed appliance in the event of frequency fluctuation.

BRIEF DESCRIPTIONS OF THE DRAWINGS

DETAILED DESCRIPTION OF THE ILLUSTRATED EMBODIMENTS

The design of a smart outlet system with fast frequency tracking for power system frequency control using distributed appliances is presented in detail as follows. Also, case studies are provided to validate the proposed frequency tracking method.

Structure of the Smart Outlet Network

Figure 1:
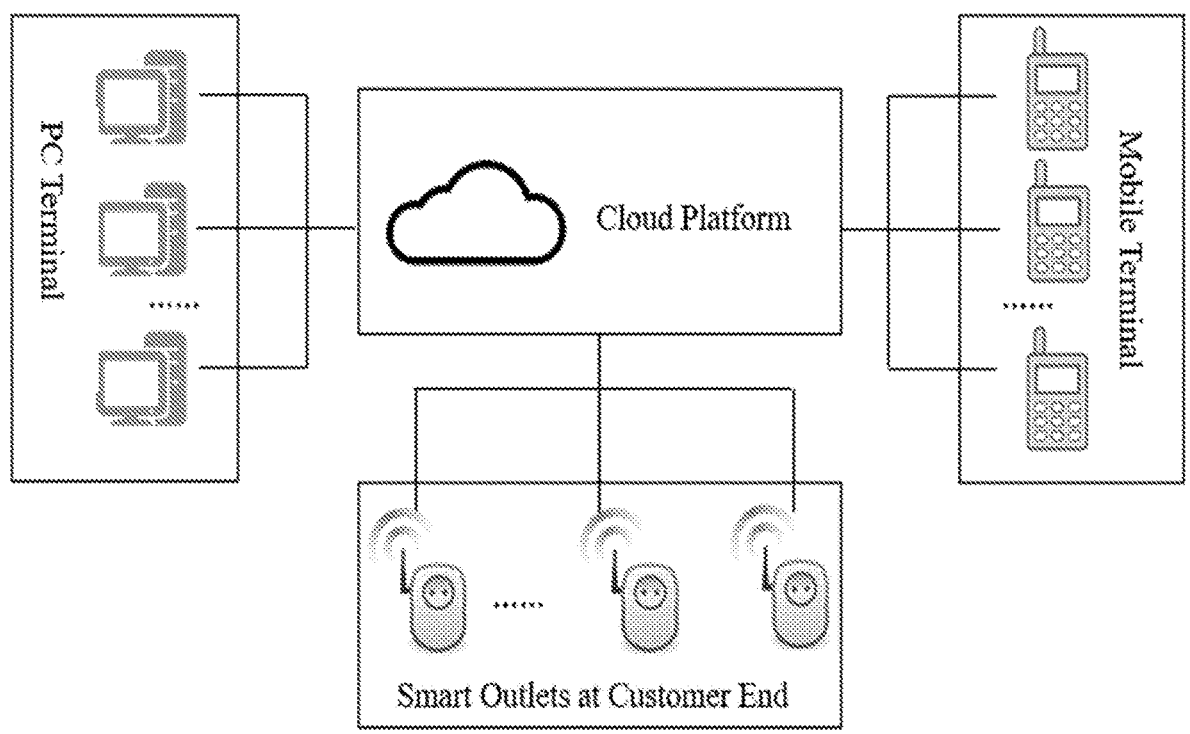
FIG. 1 shows an exemplary architecture of the smart outlet system.

The smart outlet network includes a huge number of smart outlets, a cloud platform, and PC/mobile terminals connecting them, as shown in FIG. 1. The smart outlets are computer controlled and internally has current sensors connected to a processor and wired/wireless transceivers for communicating sensed data to the cloud. The smart outlets also has relay(s) controlled by the processor to connect/disconnect the appliance to the grid based on predetermined switching methods as detailed below. The PC/mobile terminals can send commands to the processor to control the smart outlets over the Internet, as can the cloud servers, as detailed in FIG. 2.

Figure 2:
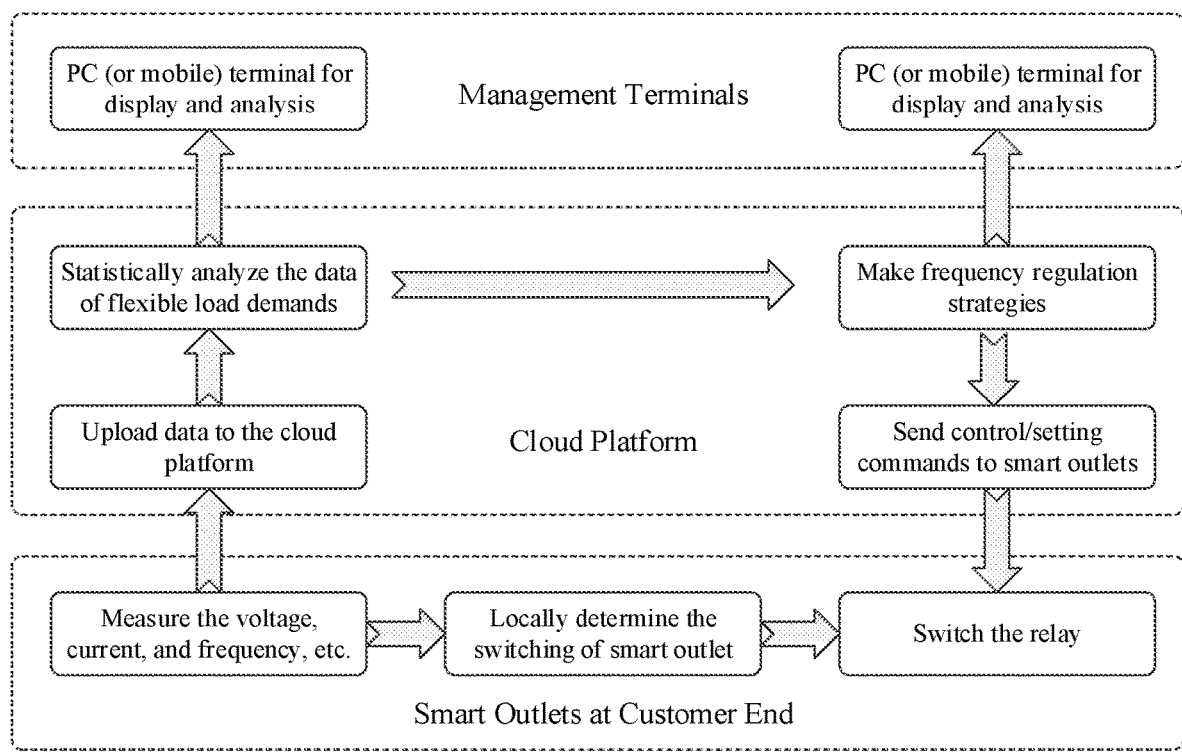
FIG. 2 shows exemplary layered functions of the smart outlet software layers.

Turning now to FIG. 2, a method of local-global control of the switching of the relay(s) is shown. Functionally, the smart outlet network can be divided into three layers: the device layer for user-end measurement and control; the cloud platform layer for data collection, storage, processing and analysis; and the terminal layer for display and analysis for the operators, as illustrated in FIG. 2.

Figure 3:
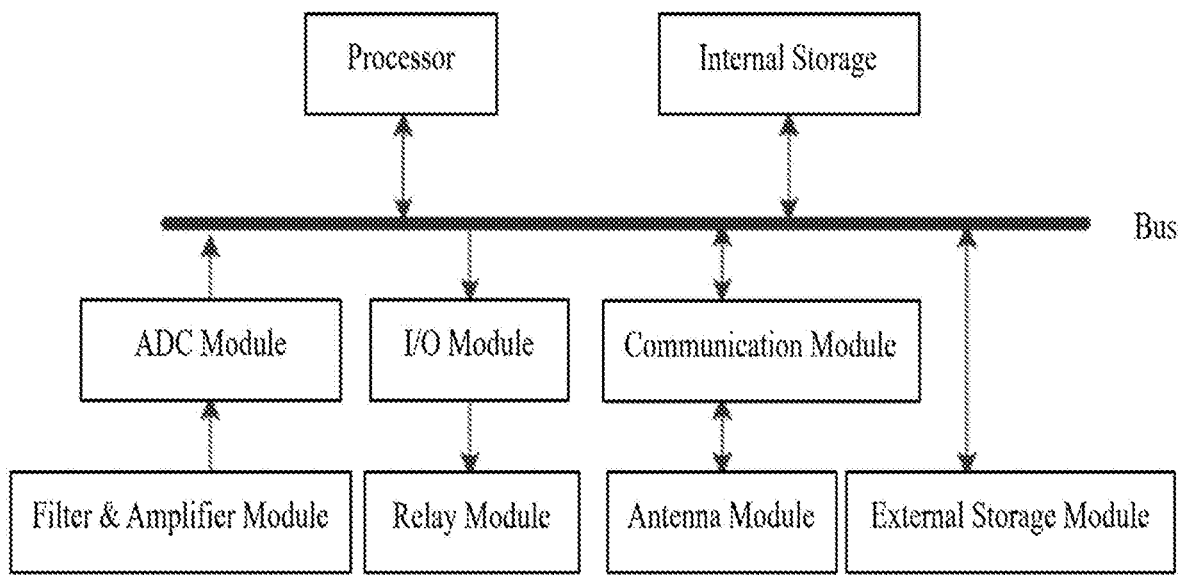
FIG. 3 shows exemplary modules of the smart outlet hardware.

A smart outlet is a hardware device for measurement and control. It is connected to the power supply of the house or building, where it is installed. All kinds of appliances (e.g., air-conditioners, refrigerators, desktop computers, lights, coffee makers, and microwaves, etc.) can connect to the smart outlet and work normally. The smart outlet is capable of measuring the voltage/current/power/frequency of the connected appliances and switch them on/off according to the customers' needs and requirement of the power systems. A smart outlet consists of multiple parts/modules, as described in FIG. 3. One primary function of a smart outlet is to continuously measure the voltage, current, power (including active power and reactive power), frequency in real time. In order to achieve this, the filter & amplifier module is applied to reduce the noise and amplify the signals. Another primary function of a smart outlet is to control the switching of the appliance. Thus, a relay is applied to control the on/off status of the appliance connected to the smart outlet. The relay can receive the control signals from the I/O Module. The communication module and the related antenna module are adopted to transmit the measurements to the cloud platform and receive control/setting from the cloud platform. The processor, which is typically a microcontroller (e.g., DSP, ARM chips), conducts all the computation work. There are internal storage and even external storage to assist the computation.

Figure 4:
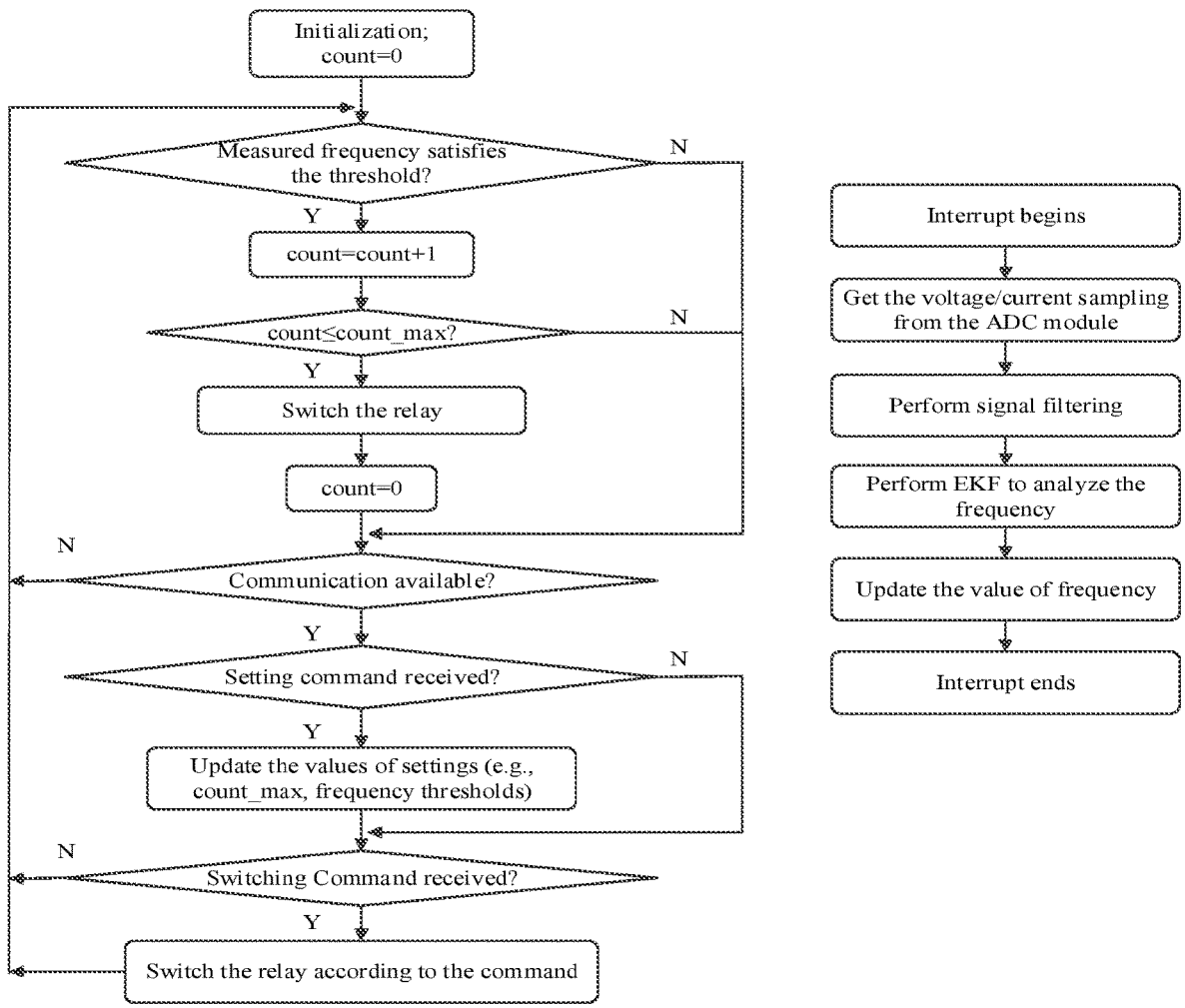
FIG. 4 shows an exemplary program flowchart of smart outlets.

The program flowchart of the smart outlet is presented in FIG. 4, explained as follows. It is comprised of two parts, i.e., the "main" part and the "interrupt" part. The "interrupt" part takes care of the measurement, and the "main" part processes the other functions.

The "main" part of the program is comprised of several steps. The major steps are explained as follows. (1) Initialization. This part includes the initialization of the hardware, parameters as well as the communication. The parameters will be set to the initial value. (2) Switching control based on measurement. The microprocessor compares the frequency measurement with some thresholds and counts the number of times that the threshold is exceeded. When the trigger condition is satisfied, the relay will be switched. (3) Communication. The outlet will check whether the communication is available frequently. When the communication is available, if a setting command is received, the smart outlet will update the settings accordingly. When a control command is received, the smart outlet will carry out the command and switch the on/off status of the relay accordingly. If the communication is not available, the program will skip the following part and return to the first step to check the measurement.

The "interrupt" part is more prioritized comparing to the main part. In the "interrupt" part, the voltage/current signals are sampled from the ADC module. Then, some filter algorithms (such as low-pass filter) is applied to reduce the noise. The filtered signal is fed into an extended Kalman filter (EKF) to calculate the frequency; finally, based on the EKF result, the value of the frequency in the "main" part is updated. The EKF algorithm is described in more detail next.

An Extended Kalman Filter Method for Frequency Tracking

Assume the voltage/current measurements after ADC of smart outlets are as follows.

$$y[t]=A\cos(\omega t/f_s+\phi)+\varepsilon[t] \quad (1)$$

where $y[t]$ is the measurement at time instant t, A is the voltage/current magnitude, $\omega=2\pi f$ the target frequency, $f_s$ is the sampling frequency, $\phi$ is the phase angle, and $\varepsilon$ is the noise corresponding to potential harmonics, disturbance, and measurement error.

1) System State Model

A nonlinear system is used whose states contain frequencies and voltage/current magnitude of measurements with a sinusoidal signal as follows.

$$s[t] \triangleq A\cos(\omega t/f_s + \phi) \quad (2)$$
$$= A[\cos(\omega t/f_s)\cos(\phi) - \sin(\omega t/f_s)\sin(\phi)]$$
$$= B^c\cos(\omega t/f_s) + B^s\sin(\omega t/f_s),$$

where $B^c \triangleq A\cos(\emptyset)$ and $B^s \triangleq -A\sin(\emptyset)$.

Consider the evolution of the sinusoidal signal as follows.

$$s[t+1] = B^c\cos(\omega(t+1)/f_s) + B^s\sin(\omega(t+1)/f_s) \quad (3)$$
$$= B^c[\cos(\omega t/f_s)\cos(\omega/f_s) - \sin(\omega t/f_s)\sin(\omega/f_s)] +$$
$$B^s[\sin(\omega t/f_s)\cos(\omega/f_s) + \cos(\omega t/f_s)\sin(\omega/f_s)].$$

Define system states as instantaneous magnitudes and frequencies as follows.

$$x[k] \triangleq \begin{bmatrix} x^c[t] \\ x^s[t] \\ x^\omega[t] \end{bmatrix} = \begin{bmatrix} B^c\cos(\omega t/f_s) \\ B^s\sin(\omega t/f_s) \\ \omega \end{bmatrix} \quad (4)$$

The state transition is presented as follows.

$$x^c[t+1]=\cos(x^\omega[t]/f_s)x^c[t]-\sin(x^\omega[t]/f_s)x^s[t]+\epsilon^c[t],$$
$$x^s[t+1]=\sin(x^\omega[t]/f_s)x^c[t]+\cos(x^\omega[t]/f_s)x^s[t]+\epsilon^s[t],$$
$$x^\omega[t+1]=x^\omega[t]+\epsilon^\omega[t], \quad (5)$$

where $\epsilon$ is the system noise.

Given the 3-by-1 state of the system x[k], the transition in a general form is as follows.

$$x[t+1]=f(x[t])+\epsilon[t], \quad (6)$$

where the transition function $f(\cdot)$ is nonlinear and can be derived from equation (4). We assume that $\epsilon[t]$ is a white Gaussian noise with zero mean and covariance matrix $Q_t$.

In a more compact form, the obtain the observation function (1) is as follows $$y[t]=Hx[t]+\varepsilon[t], \quad (7)$$

where H=[1 1 0]. The constructed system is summarized as follows.

$$x[t+1]=f(x[t])+\varepsilon[t],$$

$$y[t]=Hx[t]+\epsilon[t]. \quad (8)$$

2) Algorithm of the Extended Kalman Filter

Given the system equations (8), the method applies an EKF-based approach to estimate system states. Around the current estimated states, the method approximates the nonlinear system by a first-order linearization and applies a Kalman filter to the linearized system to find the optimal Kalman gain. The nonlinear system model and new measurements are used to calculate the new state predictions. This process iterates, and the state space model is re-linearized around updated state estimations.

Let $\hat{x}[t|j]$ denote the minimum mean squared error estimate of x[t] given measurements up to and including time j, and P[t|j] the co-variance matrix of the estimation errors. Starting from the initial estimate $\hat{x}[0|-1]$ and P[0|-1], the iteration of the EKF for the system equation (8) is summarized in Algorithm 1.

---
Algorithm 1 Extended Kalman Filter (EKF)
---
1. Initialize $\hat{x}[0|-1]$ and P[0] − 1].
2. For t = 0 : N − 1
     S = $R_t$ + HP[t|t − 1]$H^T$
     K = P[t|t − 1]$H^T S^{-1}$
     $\hat{x}$[t|t] = $\hat{x}$[t|t − 1] + K(y[t] − H$\hat{x}$|t|t − 1])
     P[t|t] = P[t|t − 1] − KHP[t|t − 1]
     $\hat{x}$[t + 1|t] = f($\hat{x}$[t|t])
     P[t + 1|t] = $F_t$P[t|t]$F_t^T$ + $Q_t$
   End
---

Here $$F_t = \frac{\partial f(x)}{\partial x}\bigg|_{x=\hat{x}[t|t]}$$

is the linearization of the system, and N is the number of measurements. The prediction process $f(\hat{x}[t|t])$ is stated as follows.

$$\hat{x}^c[t+1|t]=\hat{x}^c[t|t] \cos(\hat{x}^\omega[t|t]/f_s)-\hat{x}^s[t|t] \sin(\hat{x}^\omega[t|t]/f_s),$$

$$\hat{x}^s[t+1|t]=\hat{x}^c[t|t] \sin(\hat{x}^\omega[t|t]/f_s)+\hat{x}^s[t|t] \cos(\hat{x}^\omega[t|t]/f_s),$$

$$\hat{x}^\omega[t+1|t]=\hat{x}^\omega[t|t]. \quad (9)$$

Frequency measurement experiments have been conducted using both simulated data and real event data in both the simulation environment and the real hardware environment. It is verified that the proposed smart outlet system design can track the frequency dynamic change accurately, thus enabling the frequency response of the distributed appliance in the event of frequency fluctuation.

Case Study 1

In order to validate the proposed algorithm, multiple numerical case studies are carried out and discussed in this section. A dSPACE hardware-in-the-loop (HIL) platform, i.e., the dS1202 MicroLabBox, is employed to implement the test-bench. The MicroLabBox is interfacing with a smart outlet and the testing environment built in the Matlab/Simulink software package, which is emulating the signals of power systems (voltage/current) in a 100 kHz output rate. In practice, the signals fed into the smart outlets are analog. Nevertheless, it is noteworthy that in HIL systems, the higher the output rate is, the better the output signals can mimic the behavior of an analog wave. A generated signal is fed into the analog-digital converter (ADC) module of the smart outlet. The computation results from the micro-processor (TI CC3200) on board is transmitted back to the testing environment through the ADC channels of dSPACE and is then recorded by the host server. In this section, all measurements and computations are completed online and in a real-time fashion, e.g., for data of length 1 second, the measurement, computing, and communication process of the smart outlet is completed within 1 second. The reporting rate of the smart outlet is flexible. In this experiment, there is one reporting point every 16 milliseconds.

Figure 5:
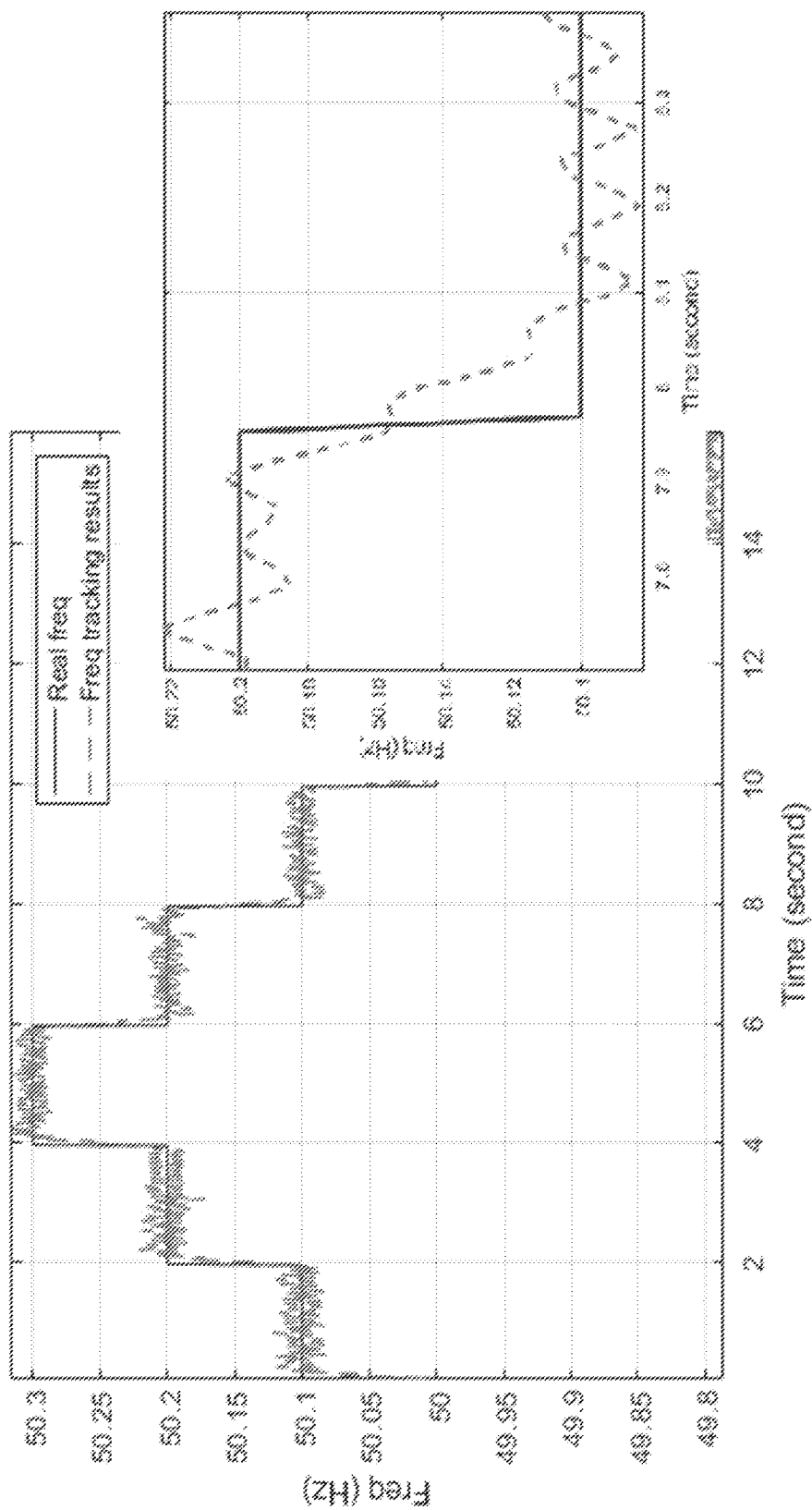
FIG. 5 shows exemplary EKF frequency measurement from step response.

Signal with step changes in frequency is emulated and fed to the smart out. A step change of 0.1 Hz in frequency occurs every 2 seconds. As shown in FIG. 5, the tracking algorithm can track the frequency change within 0:2 second or 10 cycles. Meanwhile, the deviation from the real frequency is less than ±0:02 Hz. This experiment shows the excellent dynamic tracking capability of the proposed method.

Case Study 2

Figure 6:
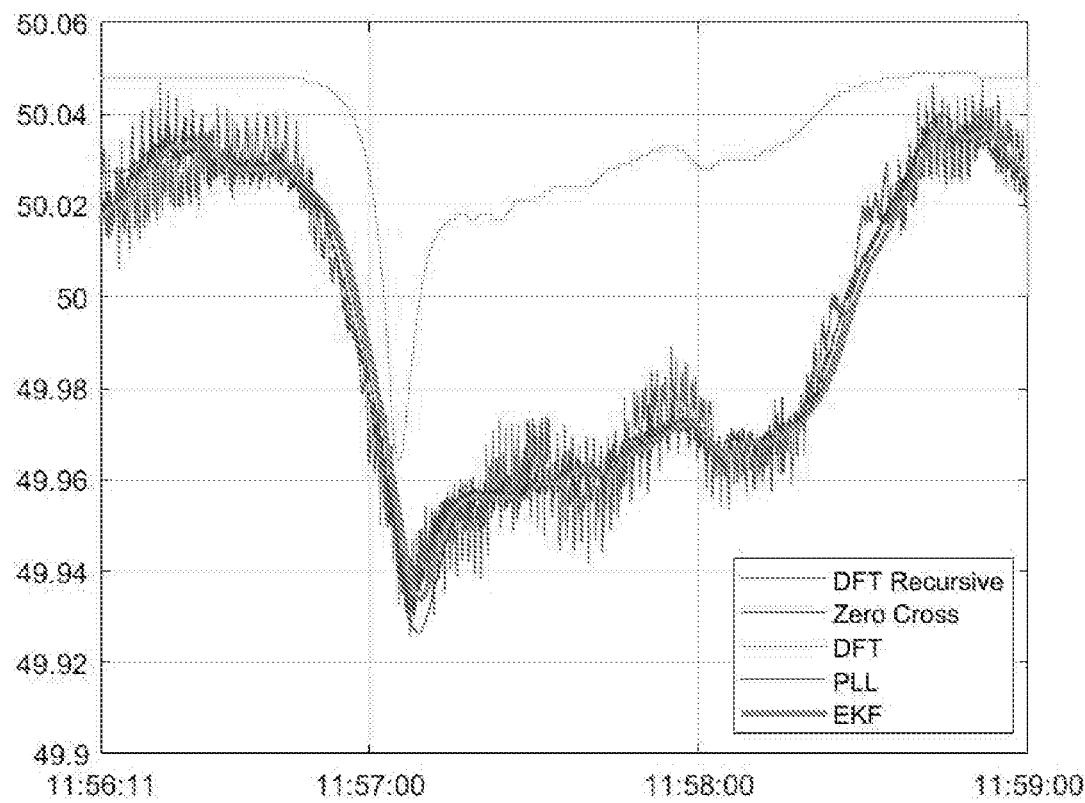
FIG. 6 shows an exemplary comparison of different frequency measurement algorithms using real event data.

In order to further verify the performance of the frequency measurement algorithm and the related frequency response, experiments using real data are conducted. The frequency response data of the 10 MW/20 MWh energy storage in Jiangsu, China in the event of frequency disturbance recorded by PMU is applied. The performance comparison is conducted among discrete Fourier transform (DFT), DFT recursive, zero cross, EKF and Phase-locked loop (PLL). The results are shown in FIG. 6. It can be shown that the discrete Fourier transform (DFT) method has some significant error compared with the other methods. The rest four methods have similar trends, but different dynamics. The output of the zero cross method has much noise and is subject to the distortion and harmonics. The output result of the proposed EKF method is smoother compared with the PLL and DFT recursive.

Figure 7:
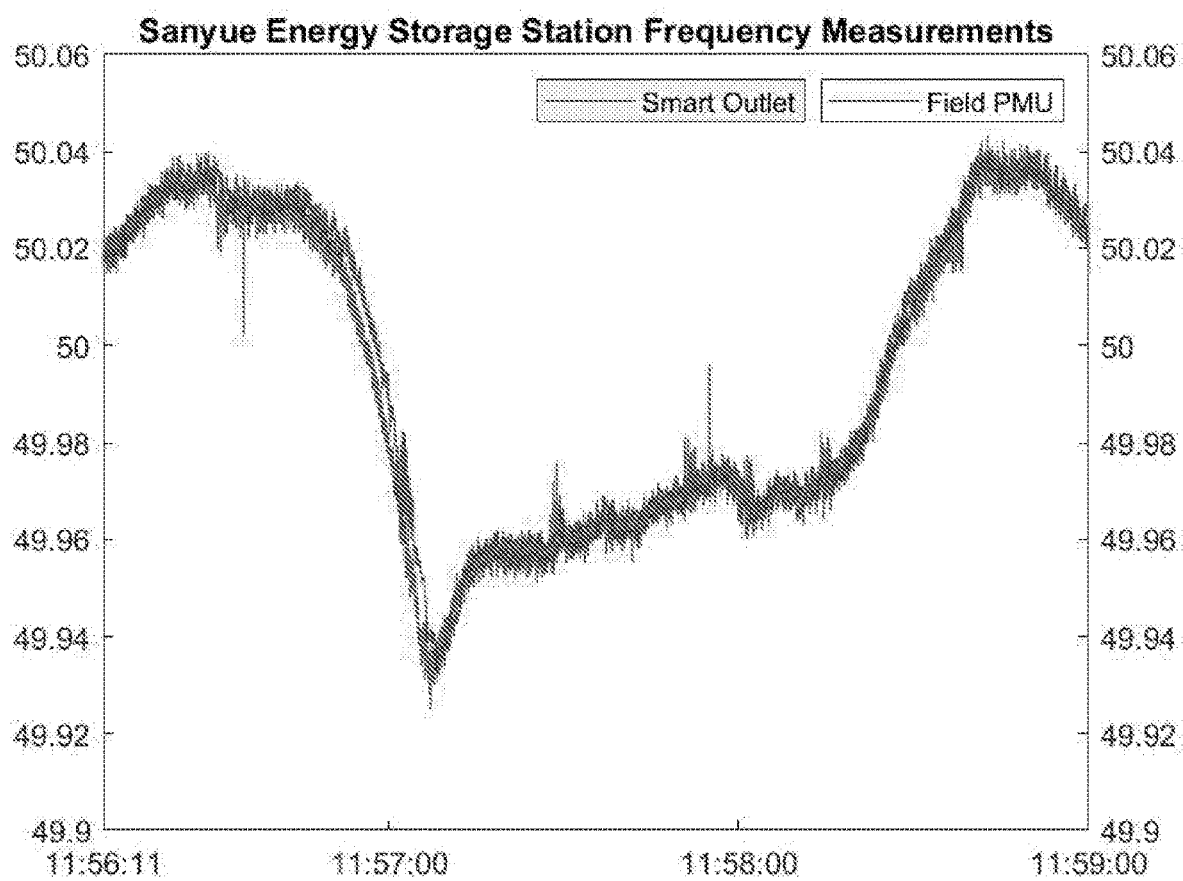
FIG. 7 shows exemplary hardware experiment results of frequency measurement.

Moreover, the method is implemented in the smart outlet hardware. The event data recorded by PMU is replayed by the omicron-lab CMC356 device. The smart outlet hardware measurement result is shown in FIG. 7. Compared with the result of PMU, the outlet is more robust and accurate with less noise as shown in FIG. 7.

In sum, it is validated that the smart outlet with the proposed EKF method can accurately and robustly measure the frequency dynamics, enabling the smart outlets to respond to frequency change.

The distributed power control appliance is arranged to repeat the above analyzing, deriving and updating for every successive change in measured frequency characteristic that results in the threshold condition being satisfied. The appliance therefore "learns", by its own analysis of the nature of the frequency characteristic change events, the trigger condition that is most appropriate and effective for the area of the grid in which it is deployed. The threshold condition used in each learning repetition may be linked to the trigger condition, for example if an updated trigger condition is more sensitive than the preceding trigger condition, then the threshold condition may also be updated to correspond to a narrower range of frequency characteristic about the nominal value. The distributed appliance may be arranged to analyses the measured frequency characteristic at times about a satisfaction of the threshold condition a certain number times without defining a trigger condition. This would allow the device to learn parameters for use in derivation of a trigger condition appropriate for the area in which the device is located before implementing the trigger condition in the device. This may avoid erroneous trigger condition satisfaction in the early stages of the deployment of the autonomous power control device in a given grid area.

The above described embodiment of a frequency control system is advantageous since it is an autonomous, stand-alone network of devices which automatically operates, and therefore may be relatively cost effective in its operation and easy to implement.

In various embodiments detailed in the above description, reference is made to a distributed measurement appliances, but it should be noted, however, that in some embodiments, individual measurement systems may be used. This distributed measurement system may comprise, for example, a combination of the components of the measurement device referred to in FIG. 3, namely a data store, network interface, an I/O interface, a processor, and various power detectors arranged in a distributed way. The measurement system may also include one or more centralized control units. These centralized control units may be used, for example, for centralized processing of measurements taken by the measurement devices, or any other device described herein, and/or, for example, for performing the receiving and transmitting of characteristics, parameters, and/or conditions described herein from and/or to any of the devices described herein. The centralized control unit may also perform functions of data storage otherwise implemented in the various devices described herein.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method to control a power grid frequency, comprising:

distributing a plurality of outlet devices each containing a relay over a grid;

continuously measuring the power grid frequency providing power to each of the distributed outlet devices, wherein the each of the distributed outlet devices is plugged into an outlet;

updating a value of the power grid frequency using an extended Kalman filter within the each of the distributed outlet devices at a low-voltage single-phase distribution level by determining the state transition of extended Kalman filter:

$x^c[t+1]=\cos(x^\omega[t]/f_s)x^c[t]-\sin(x^\omega[t]/f_s)x^s[t]+\epsilon^c[t]$, $x^s[t+1]=\sin(x^\omega[t]/f_s)x^c[t]+\cos(x^\omega[t]/f_s)x^s[t]+\epsilon^s[t]$, $x^\omega[t+1]=x^\omega[t]+\epsilon^\omega[t]$, where $f_s$ is the sampling frequency; $x^c$, $x^s$ and $x^\omega$ consist of the state of the extended Kalman filter; t is the time; and $\epsilon^c$, $\epsilon^s$, and $\epsilon^\omega$ are the noise;

determining and sending a threshold to the each of the distributed outlet devices at and by a cloud control center;

tracking a frequency change within 0.2 second or 10 cycles and enabling a fast frequency response in response to a frequency fluctuation; and switching off the relay in the each of the distributed outlet devices that provides power to an appliance based on the result of comparing the power grid frequency with the threshold sent from the cloud control center.

2. The method of claim 1, comprising switching off the relay when the power grid frequency exceeds the threshold for a predetermined number of times.

3. The method of claim 1, comprising low-pass filtering voltage and/or current sampling.

4. The method of claim 1, comprising providing a filtered voltage and/or current sampling as input to an extended Kalman filter (EKF) to calculate the power grid frequency.

5. The method of claim 1, comprising determining the relationship between a sampling and the power grid frequency:

$y[t]=A\cos(\omega t/f_s+\phi)+\epsilon[t]$ where y[t] is the sampling at time t, A is the voltage and/or current magnitude, $\omega=2\pi f$ and $\omega$ is the frequency in the unit of rad/s, $f$ is the power grid frequency, $f_s$ is the sampling frequency, $\phi$ is the phase angle, and $\epsilon$ is the noise corresponding to potential harmonics, disturbance, and measurement error.

6. The method of claim 1, comprising modeling a non-linear system whose states contain frequencies and voltage and/or current magnitude of measurements.

7. The method of claim 1, comprising determining a relationship between an ideal sinusoidal signal and the power frequency as:

$$s[t] \triangleq A\cos(\omega t/f_s + \phi)$$
$$= A[\cos(\omega t/f_s)\cos(\phi) - \sin(\omega t/f_s)\sin(\phi)]$$
$$= B^c\cos(\omega t/f_s) + B^s\sin(\omega t/f_s),$$

where s[t] is the ideal sinusoidal signal without noise, $B^c \triangleq A\cos(\emptyset)$ and $B^s \triangleq A\sin(\emptyset)$, A is the voltage and/or current magnitude, $\phi$ is the phase angle, $f_s$ is the sampling frequency, $\omega$ is the power grid frequency in the unit of rad/s, and t is the time.

8. The method of claim 1, comprising determining the evolution of an ideal sinusoidal signal as:

$$s[t+1] = B^c\cos(\omega(t+1)/f_s) + B^s\sin(\omega(t+1)/f_s)$$
$$= B^c[\cos(\omega t/f_s)\cos(\omega/f_s) - \sin(\omega t/f_s)\sin(\omega/f_s)] +$$
$$B^s[\sin(\omega t/f_s)\cos(\omega/f_s) + \cos(\omega t/f_s)\sin(\omega/f_s)].$$

where s[t+1] is the ideal sinusoidal signal of the next time step t+1, $B^c \triangleq A\cos(\emptyset)$ and $B^s \triangleq -A\sin(\emptyset)$, A is the voltage and/or current magnitude, $\phi$ is the phase angle, $f_s$ is the sampling frequency, $\omega$ is the power grid frequency in the unit of rad/s, and t is the time.

9. The method of claim 1, comprising defining extended Kalman filter system states as instantaneous magnitudes and frequencies as:

$$x[t] = \begin{bmatrix} x^c[t] \\ x^s[t] \\ x^\omega[t] \end{bmatrix} = \begin{bmatrix} B^c\cos(\omega t/f_s) \\ B^s\sin(\omega t/f_s) \\ \omega \end{bmatrix}$$

where $x^c$, $x^s$ and $x^\omega$ consist of the state x[t] of the extended Kalman filter, $B^c \triangleq A\cos(\emptyset)$ and $B^s \triangleq -A\sin(\emptyset)$, A is the voltage and/or current magnitude, ϕ is the phase angle, $f_s$ is the sampling frequency, ω is the power grid frequency in the unit of rad/s, and t is the time.

10. The method of claim 1, comprising considering a white noise in the extended Kalman filter state transition as:

$$x[t+1]=f(x[t])+\epsilon[t]$$

where the transition function $f(\cdot)$ is a nonlinear function indicating the extended Kalman filter system state transition relationship between the current state x[t] and the state x[t+1] of next time step, and ϵ[t] is a white Gaussian noise with zero mean.

11. The method of claim 1, comprising determining a relationship between the observation and state of the extended Kalman filter as:

$$y[t]=Hx[t]+\epsilon[t]$$

where y[t] is the observation at time t, H is a vector [1 1 0], x[t] is the state of extended Kalman filter at time t, ϵ[t] is the noise at time t.

12. The method of claim 11, comprising approximating a nonlinear extended Kalman filter system with a first-order linearization and applying a linear extended Kalman filter to find an optimal Kalman gain.

13. The method of claim 12, wherein the nonlinear system and previously presented measurements are used to calculate new state predictions.

14. The method of claim 13, wherein a state space model is re-linearized around updated state estimations.

15. The method of claim 13, where $\hat{x}[t|j]$ denotes a minimum mean squared error estimate of x[t] given measurements up to and including time j, and P[t|j] is a covariance matrix of estimation errors, comprising determining:

starting from the initial, estimating $\hat{x}[0|-1]$ and P[0|−1], where $$F_t = \frac{\partial f(x)}{\partial x}|_{x=\hat{x}[t|t]}$$

is the linearized system, and N is the number of measurements; and predicting $f(\hat{x}[t|t])$ as:

$$\hat{x}^c[t+1|t]=\hat{x}^c[t|t]\cos(\hat{x}^\omega[t|t]/f_s)-\hat{x}^s[t|t]\sin(\hat{x}^\omega[t|t]/f_s),$$

$$\hat{x}^s[t+1|t]=\hat{x}^c[t|t]\sin(\hat{x}^\omega[t|t]/f_s)+\hat{x}^s[t|t]\cos(\hat{x}^\omega[t|t]/f_s),$$

$$\hat{x}^\omega[t+1|t]=\hat{x}^\omega[t|t]$$

where $\hat{x}^c$, $\hat{x}^s$, and $\hat{x}^\omega$ are the predicted values of the state of extended Kalman filter, t is the time, $f_s$ is the sampling frequency.

* * * * *